Figure 1:
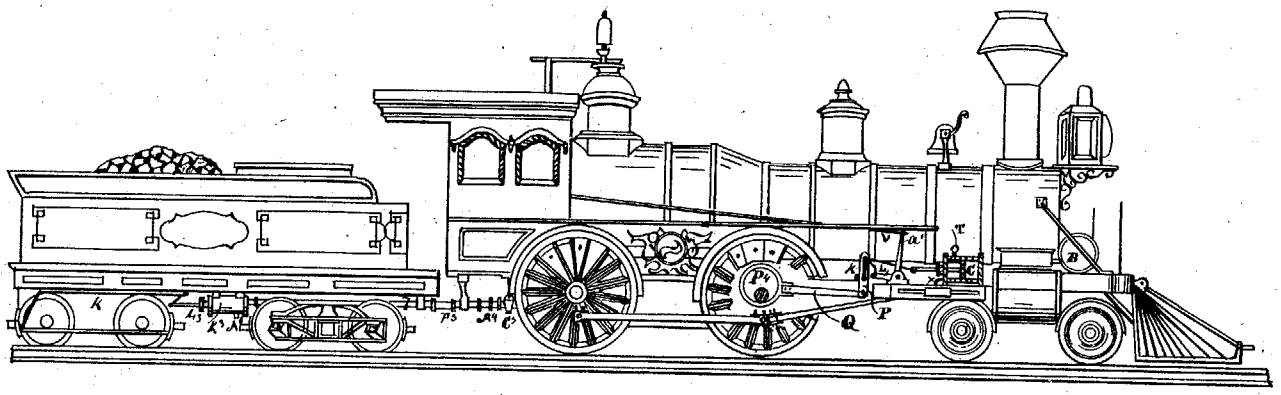

3 Sheets—Sheet 1.

B. W. SMITH & E. O. FRINK,

Assignors to J. A. McKENZIE.

Steam and Air Brakes.

No. 8,778. Reissued June 24, 1879.

Witnesses;
Rosie Smith
Ida Smith

Inventors.
Erastus O. Frink
Benjamin W. Smith
per Chas. E. Marsh
their attorney

PETERS, PHOTO-LITHOGRAPHER, WASHINGTON, D. C.

3 Sheets—Sheet 2.
B. W. SMITH & E. O. FRINK,
Assignors to J. A. McKENZIE.
Steam and Air Brakes.
No. 8,778. Reissued June 24, 1879.
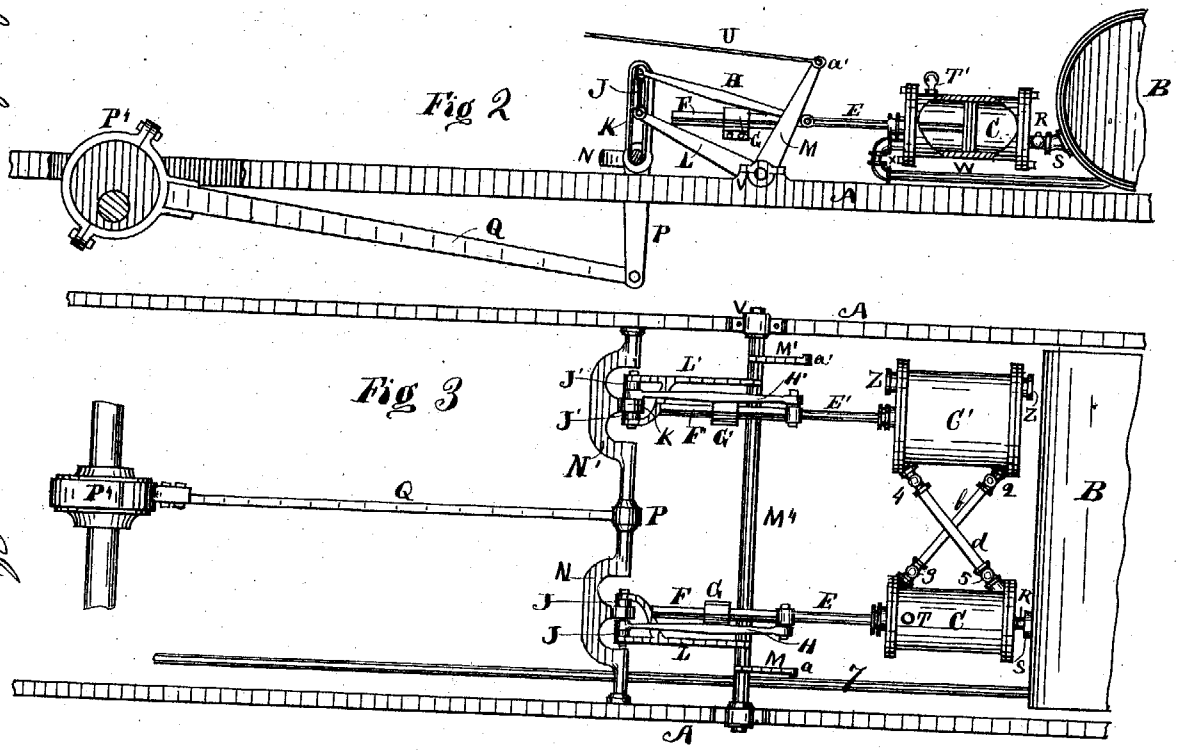
Witnesses;
Josie Smith
Ida Smith
Inventors.
Ernestus O. Frink
Benjamin W. Smith
Per Chas. E. Marsh
their Attorney
N. PETERS, PHOTO-LITHOGRAPHER, WASHINGTON, D. C.

B. W. SMITH & E. O. FRINK,
Assignors to J. A. McKENZIE.
Steam and Air Brakes.
No. 8,778. Reissued June 24, 1879.
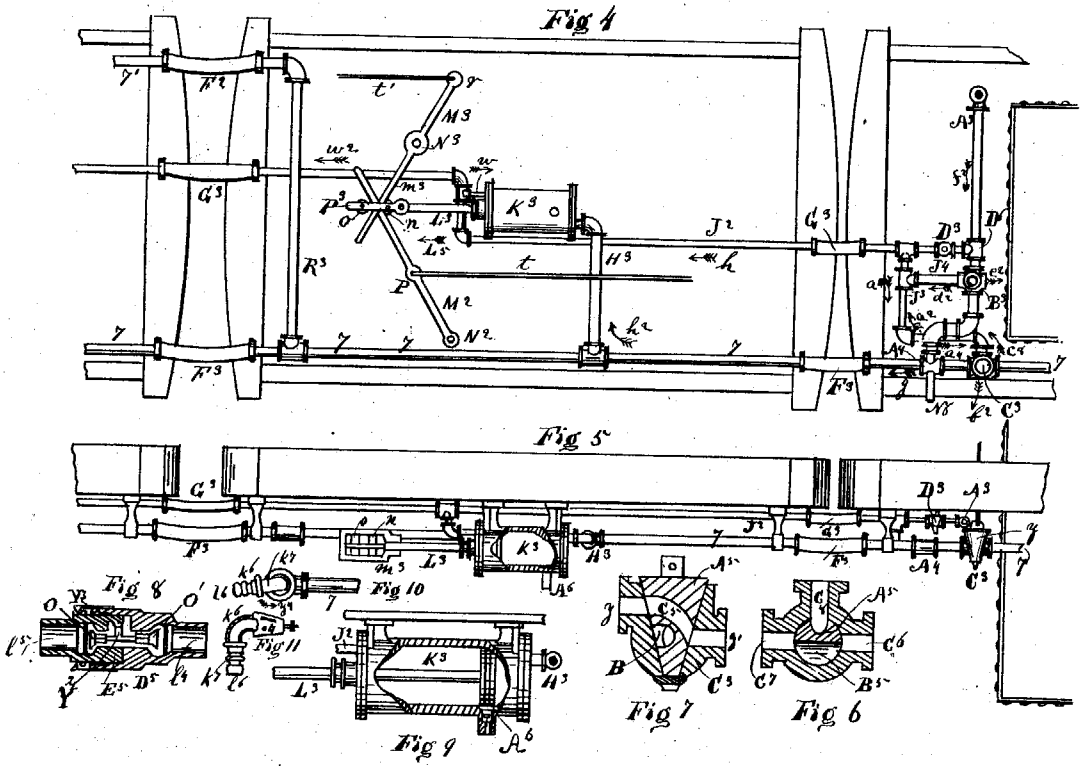
Witnesses;
Josie Smith
Ida Smith
Inventors.
Erastus O. Frink
Benjamin W. Smith
Per Chas. E. Wersly
their Attorney
N. PETERS, PHOTO-LITHOGRAPHER, WASHINGTON, D. C.

UNITED STATES PATENT OFFICE.

BENJAMIN W. SMITH, OF ROCKPORT, AND ERASTUS O. FRINK, OF INDIANAPOLIS, ASSIGNORS TO JAMES A. McKENZIE, OF INDIANAPOLIS, IND.

IMPROVEMENT IN STEAM AND AIR BRAKES.

Specification forming part of Letters Patent No. 136,462; dated March 4, 1873; Reissue No. 8,778, dated June 24, 1879; application filed May 23, 1877.

*To all whom it may concern:*

Be it known that we, BENJAMIN W. SMITH, of the city of Rockport, Indiana, and ERASTUS O. FRINK, of the city of Indianapolis, Indiana, have invented certain Improvements in Compressed-Air and Steam Power Brakes, of which the following is a specification.

This invention relates to the construction of a power car-brake for railway-cars to be operated by compressed air or steam or other elastic compressed material.

Referring to the accompanying drawings, Figure 1, Sheet 1, represents a side elevation of a locomotive and tender embodying our improvement. Fig. 2, Sheet 2, is a sectional elevation in detail of the pumping-cylinders, links, rock-shaft, connecting-rods, and air chamber or tank. Fig. 3, Sheet 2, is a plan of the same, showing the arrangement of air-pipes and check-valves and the working parts more fully. Fig. 4, Sheet 3, is a plan in detail of the arrangements of the pipes combined either for air or steam, and their connections with the brake-cylinder and brake-rods. Fig. 5, Sheet 3, is an elevation, partially in section, of the same. Fig. 6, Sheet 3, is a cross-section of a four-way cock. Fig. 7 is a vertical section of the same. Fig. 8 is a longitudinal section of one of our couplings. Fig. 9 is a sectional view of the brake-cylinder, showing some improvements on the inside. Fig. 10 is a side view of a cock used for coupling. Fig. 11 is a plan of the key to the above coupling.

Like letters refer to like parts in the drawings.

Our improvement is very especially confined to the arrangement and construction of air-pumps and steam-pumps, in combination with their various working parts, in such a manner that, when they are applied to locomotives and cars, the engineer has always under his control the necessary arrangements to stop a train almost instantly, the advantages of which are as follows: First, the engineer's attention is not taken away from his most important of duties—that of watching the track in front; second, the compression of air in the tank is a sure and certain result when the engine is in motion; third, the ability to use either compressed air from the air-tank or steam direct from the boiler at will; fourth, the certainty of throwing off the brakes, and the use of steam for warming the cars.

To enable others skilled in the art to make and use our improvement, we will describe its construction and operation, reference being had to the accompanying drawings.

Figs. 2 and 3 of Sheet 2 show the arrangement of two cylinders or air-pumps located under the boiler, and immediately back and over the rear end of the front trucks of a locomotive, and show the eccentric-rod connecting the pump mechanism with the eccentric on the shaft of the front driving-wheels.

The cylinders C and $C^1$ are attached to a suitable cross-bar made fast to the engine-frame A A or to the lower part of the shell of the boiler. The cylinder $C^1$ is of larger capacity than the cylinder C, and has two air-valves, Z Z—one at each end. The two cylinders C and $C^1$ are connected to each other by means of pipes *b* and *d*, each of these pipes having one or more check-valves, 2 3 4 5. The pipes *b* and *d* cross each other, or may be arranged in any other way, so that the desired effect is produced of supplying air from the cylinder $C^1$ to the cylinder C, as will be more fully described hereinafter.

B is an air-tank, and may be located at any convenient place on the engine, and is made air-tight, and is provided with a puppet-valve and pressure-gage for safety. This tank holds the compressed air in store ready for use when required.

Immediately in the rear of the pumping-cylinders C and $C^1$ is a shaft, $M^4$, that is secured to the engine-frames A A by suitable boxes V V. On this shaft are two levers, M and $M^1$. These levers have a rod, U, attached to their outer end, and extending from there into the cab. By means of these rods the pumping-cylinders C and $C^1$ are worked by either the engineer or fireman. The shaft $M^4$ is also provided with two forked levers, L and $L^1$. On the end of each of these forks is attached one end of the lifting-links J J and $J^1$ $J^1$. The upper ends of these links are attached to a sliding box (not shown) that works in the slot O of the arm K, that projects above the rock-shaft N $N^1$. At the upper ends of the links J and $J^1$, and between them and the sliding box, the connecting-rods H and $H^1$ are secured. The other ends of the rods are fastened by means of studs and nuts to the piston-rods E and $E^1$ of the pumping-cylinders C and $C^1$. F and $F^1$ are guide-bars for the piston-rods E and $E^1$. G and $G'$ are boxes for the guide-bars F and $F^1$ to work in. P is an arm projecting downward from the rock-shaft N $N^1$, and is connected at its lower end to an eccentric-rod, Q.

The eccentric $P^4$, Fig. 1, Sheet 1, is attached to the front driving-wheel axle, and by means of this the pumps C and $C^1$, located under the boiler and over and aft the trucks, are supplied with power. This manner of working the air-pumps C and $C^1$—to wit, by an eccentric attached to the front driving-wheel axle, with the eccentric-rod worked thereby, projecting forward toward the pumps—may be varied to suit the inclination of the different master mechanics in any manner, so that the desired effect may be produced on the two pumps, or upon a single pump, which may, but with less advantage, be used instead of two pumps.

The location and arrangement of a pump or pumps in this manner under the boiler, so as to be worked by an eccentric, with its rod extending forward, is the most important feature of our invention, for the working of our entire system depends upon a combination and arrangement of an air pump or pumps in such a manner with the front driving-wheel axle that the pump or pumps may be worked by an eccentric attached to that axle, the eccentric-rod extending forward and connecting the pump or pumps with the eccentric; and this combination, location, and arrangement once discovered and invented, various systems of air-brakes besides ours become possible. We are the first thus to utilize the shaft or axle of the front driving-wheel.

By means of this leading feature of our invention it is obvious that one air-pump only, or more than two, may thus be located under the boiler and operated by the axle of the front driving-wheels. By the employment of our two air-pumps instead of one a saving in air is obtained and the spasmodic action upon the eccentric which is exerted when a single ordinary air-pump is used is obviated.

According to the manner which we have preferred of connecting our pumps with the eccentric $P^4$, their operation is as follows: After the connections are all made and the engine begins to move, the eccentric $P^4$ on the front driving-wheel axle revolves, and the rod Q imparts its motion to the arm P of the rock-shaft N N, causing the rock-shaft to oscillate backward and forward. Now, if the engineer or fireman pushes the rods U U forward, they, being connected with the levers M and $M^1$, cause the shaft $M^4$ to slightly revolve, and the forked lever L $L^1$ raises the box in the slot O of the arm K by means of the links J J and $J^1$ $J^1$. This movement carries the ends of the connecting-rods H $H^1$, that are secured to the links J $J^1$, to the upper extremity of the slot O, and the air-pumps C and $C^1$ are worked at their full stroke, and as the pistons D and $D^1$ move forward all of the air that is in the front end of the cylinder $C^1$ is forced, through the check-valves 2 and 3 and pipe *b*, into the rear end of the cylinder C.

Again, as the pistons D and $D^1$ move backward the compressed air that is in the rear end of the cylinder C is forced into the tank B by means of the check-valve X and pipe W, Fig. 2, Sheet 2, and the air that is in the rear end of the cylinder $C^1$ is conveyed into the front end of the cylinder C through the check-valves 4 and 5 and the pipe *d*, and as the pistons D and $D^1$ again move forward the compressed air that is in the front end of the cylinder C is driven into the tank B through the pipe S and check-valve R.

By this arrangement of supplying the cylinder C with compressed air from the larger cylinder, $C^1$, we overcome the difficulty of all other air-pumps for this purpose, and the stroke of the pump-pistons D and $D^1$ may be varied at pleasure by drawing the rod U in or pushing it out, as specified.

The tank B is not to be necessarily located at the place indicated on Sheet 2, and could be dispensed with entirely.

The pipe 7 is connected with the tank B, or, if the tank B is not necessary, it may be coupled to the pipes W and S, Fig. 2, Sheet 2, that lead from the cylinder C and extend back to the rear of the fire-box and immediately under the foot-boards of the cab, as shown in Fig. 1, Sheet 1, or more in detail in Figs. 4 and 5, Sheet 3. Here it will be seen that the pipe 7 connects with a four-way cock, $C^3$, and extends along under the tender and train, having flexible couplings at the ends of the cars. At the rear of the four-way cock $C^3$ is a three-way coupling or T, $A^4$, and to this coupling the steam-pipe $A^3$ is attached. Between the coupling $A^4$ and that part of the steam-pipe $A^3$ that leads to the boiler is another four-way cock, $B^3$, and another three-way coupling or T, $D^6$. From this coupling the pipe $J^2$ extends along under the tender and cars, having flexible couplings, the same as in pipe 7, and a common cock, $D^3$, close to the coupling $D^6$. This pipe makes connections with the brake-cylinders $K^3$ at its rear heads. The pipe 7 has a branch, $H^3$, that connects with the front ends of each of the brake-cylinders $K^3$, and another branch, $R^3$, at the ends of each car, so that if the cars are turned around the connections, by means of the couplings $F^2$ and $F^3$, are always right, and also keep up the connections to the brake-cylinder $K^3$ if one coupling should become uncoupled. Out of the inside way, $C^8$, of the four-way cock $C^3$ is a pipe, $J^3$, which connects with the pipe $J^2$, and out of the rear way of the four-way cock $E^3$ is another pipe, $J^4$, that also connects with the pipes $J^3$ and $J^2$, the operation of which will be fully described hereinafter.

$K^3$ represents the brake-cylinder that is attached to the under portion of the cars, and has a piston on the end of piston-rod $L^3$, which has an adjustable roller-head, $P^3$, for the brake-levers to work in. The head $P^3$ is hinged on the end of the piston-rod $L^3$ at $m^3$, and has a partition through the center to keep the brake-levers separated. Above and below the partition are two rollers, *o o* and *n n*. Between these rollers the brake-levers $M^2$ and $M^3$ pass, one above and the other below the partition. The brake-lever $M^3$ works on the stud $N^3$, and the lever $M^2$ on the stud $N^2$. Both of these studs are secured to the bottom of the car. The brake-rod *t* is attached to the lever $M^2$ at *p*, and the rod *t'* to the lever $M^3$ at *r*.

Figs. 6 and 7, Sheet 3, show vertical and cross sections of a four-way cock, in which $C^3$ represents the shell. $A^5$ is the key, having a curved hole, $C^5$, cored through it, and a groove, $B^5$, on one side. When the key $A^5$ stands as in Fig. 6, the compressed air or steam passes in at $C^6$, and through the groove $B^5$ in the key, and out at $C^7$. At the same time any steam or air that may be in the rear ends of the brake-cylinders $K^3$ is exhausted through the cored hole $C^5$ in the key $A^5$ by means of the openings $C^8$, cored hole $C^5$, and opening *y*, in the direction of the arrows $a^4$ and $b^2$.

The operation of the air and steam upon the brakes through the pipes, as described, is as follows: When the key $A^5$ of the four-way cock $C^3$ is turned into the position of Fig. 6, the air from the tank B or pumping-cylinder C rushes along through the pipe 7, in the direction of the arrow *y''*, to all of the cars, and branches at the pipe $H^3$ in the direction of the arrow $h^2$, enters the cylinders $K^3$, and forces the pistons in the direction of the arrow $L^5$. This motion causes the brake-levers $M^3$ and $M^2$ to be pushed forward by means of the adjustable head $P^3$ and rollers *o o* and *n n*, and the brakes are held rigid in their position against the trucks. If one of the brake-rods *t* or *t'* should be longer than the other, the adjustable head $P^3$ will take up the slack by sliding along the tight lever until the strain is equally divided between the two rods *t* and *t'*. The brakes may be worked in the opposite direction by reversing the connection of the steam-pipes $H^3$ and $J^2$ in the cylinder $K^3$ and the brake-levers $M^2$ and $M^3$. As the key $A^5$ is turned one-fourth around, and the groove $B^5$ opens connections between the openings $C^7$ and $C^8$, the opening $C^6$ is closed, and the pressure on the brakes is released by the exhaust passing back through the pipe 7, openings $C^7$ $C^8$, pipes $J^3$ $J^2$, in the direction of the arrow $a^2$ and *h*, into the rear end of the brake-cylinder $K^3$, and forces the piston in the reverse direction of the arrow $L^5$, and the brakes are released by means of the head $P^3$, rollers *o o* and *n n*. If the exhaust is not sufficient to throw off the brakes, pressure can be applied by turning the key $A^5$ in the four-way cock $C^3$ so that the compressed air can enter through the opening $C^6$, passing the groove $B^5$ in the key, and into the pipes $J^3$ and $J^2$ by the opening $C^8$. If, for instance, the train should be required to stand for any length of time on a grade, and the air should leak away and not be sufficient to hold the train, then, by opening the four-way cock $B^3$, steam can be supplied and the train held as long as required.

By this combination we always have a sure action on the brakes, can hold them set any length of time, and release them without the possibility of the brake-shoes sticking. This is of great advantage, as with any of the other power-brakes the engineer has more or less slacking back to get his brakes off after they have been set. The pipe $J^2$ can also be used for heating the cars by steam by opening the cock $D^3$ and making connections between the pipe $J^2$ and the pipes in the cars. The cock $D^3$ is always left open a little when steam is used for the brakes, and a small quantity of steam is allowed to pass into the rear end of each of the brake-cylinders $K^3$ in the direction of the arrows W and $W^2$, and through a groove, $N^4$, in the bottom of the cylinder, Fig. 9, Sheet 3, in the direction of the arrow X, and out at the valve $A^6$. The groove $N^4$ allows the steam to circulate through the cylinders and keeps them from freezing. The water that is condensed passes out at the valve $A^6$ in the direction of the arrow $X^2$, and the steam passes back through the pipe 7 to the pet-cock $N^6$, that is under the cab at a convenient place, so that the engineer can see that the circulation is kept up. The valve $A^6$ is held up by a spring until pressure is applied to the brakes, when the predominance of pressure closes the valve until the pressure is released, when the valve again opens, as above specified.

We do not confine ourselves to operating one piston in the cylinder, but can work two by letting steam or air in at the center of the cylinders and exhausting into each end by means of two pipes from the main exhaust-pipe $J^2$, and having the cylinder provided with a groove, $N^4$, in the center, for the purpose specified; or the two pistons may be worked from each end of the cylinder $K^3$ toward the center by connecting the pipe $H^3$, by means of a branch pipe, to each end of the cylinder and the exhaust-pipe $J^2$ at the center. The cylinder in this case would have to have a groove, $N^4$, and two valves, $A^6$, one at each end.

Fig. 8, Sheet 3, is a section of one of the couplings that connect the pipes 7 and $J^2$ between the cars, and consists of a socket, $E^5$, and a sleeve, $D^5$, in which are placed two disk-valves, which are held open while coupled by two projections on the hinge-trip $Y^2$ in such a manner that the air or steam has a free circulation through the coupling when the socket $E^5$ and sleeve $D^5$ are connected. If the coupling should become separated, either by accident or design, each half drops down, and the disk-valves O O' being released from the trip $Y^2$ immediately fall into their respective seats and stop any further passage of air or steam. The flexible coupling or hose is attached to that part of the sleeve $D^5$ and socket $E^5$ that is marked $l^4$ and $l^5$.

Figs. 10 and 11 represent the other coupling, in which $K^5$ is the shell. $K^6$ is the key. This key has a long slot, $o^4$, at one side, and a handle, $K^6$, that is hollow. On this handle $K^6$ the flexible coupling or hose is attached at $K^7$, the operation of which is as follows: The cock $K^5$ is screwed onto the ends of the pipes 7 at the end of the cars, and the keys $K^6$ are connected together by any flexible hose. This hose is in two pieces. One end of each is permanently secured to the key $K^6$ at $K^7$, and the other end is coupled at the center in any suitable manner, so that if they become uncoupled the weight of each half of the hose as it drops will close the cock $K^5$ by turning the key $K^6$ so that the ports are closed.

We claim—

1. The combination of the two cylinders $C^1$ and C, with suitable valves and pipes, when one cylinder is larger than the other and used as an air-compressor, substantially as and for the purpose set forth.

2. The combination of the two cylinders $C^1$ and C, with their several valves and connections, with the reservoir B, substantially as and for the purpose set forth.

3. The combination of the several working parts, as specified, with the two cylinders $C^1$ and C, substantially as and for the purpose hereinbefore set forth.

4. The combination of the steam-pipe $A^3$, provided with a four-way cock, $B^3$, and connected with the air or steam pipe 7, with the brake-cylinder $K^3$ and exhaust-pipes $J^2$ and $J^4$, substantially as and for the purpose set forth.

5. The four-way cock $C^3$ or $B^3$, when constructed and operated substantially as and for the purpose set forth.

6. The brake-cylinder $K^3$, provided with one or more grooves, $N^4$, at the bottom of the cylinder, substantially as and for the purpose set forth.

7. The combination of the trip $Y^2$ of the coupling, provided with a projection on each side of the lower end, the joint $Y^3$ on the sockets $E^5$, the sleeve $D^5$, disk-valves O O′, and the conducting-pipes 7 of an air-brake mechanism, substantially as and for the purposes described.

8. The side cock $K^5$, provided with a key, $K^6$, and hollow handle $K^7$, and the pipes 7 or $J^2$, in combination with a system of air-brake mechanism, substantially as and for the purposes described.

9. An air pump or pumps, arranged under the boiler of a locomotive between the axle of the front wheels and the forward trucks, in combination with a continuous system of air-brake mechanism, constructed and arranged as herein shown and described.

10. An air pump or pumps, arranged under the boiler of a locomotive between the axle of the front driving-wheels and the forward trucks, in combination with a system of continuous air-brake mechanism and an air receiver or tank, constructed and arranged substantially as described.

Witness our hands.

BENJ. W. SMITH.
ERASTUS O. FRINK.

Witnesses:
CHAS. E. MARSH,
WM. A. MILLSPAUGH.